United States Patent
Papava et al.

(10) Patent No.: US 11,451,593 B2
(45) Date of Patent: Sep. 20, 2022

(54) PERSISTENT CO-PRESENCE GROUP VIDEOCONFERENCING SYSTEM

(71) Applicant: Meta Platforms, Inc., Menlo Park, CA (US)

(72) Inventors: Ilona Papava, London (GB); Aryeh Selekman, Washington, DC (US); Nicholas John Shearer, London (GB); Andreea Selagea, London (GB)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/354,544

(22) Filed: Jun. 22, 2021

(65) Prior Publication Data
US 2022/0078218 A1    Mar. 10, 2022

Related U.S. Application Data

(60) Provisional application No. 63/076,307, filed on Sep. 9, 2020.

(51) Int. Cl.
| | |
|---|---|
| *H04N 7/15* | (2006.01) |
| *H04L 65/401* | (2022.01) |
| *H04L 65/1093* | (2022.01) |
| *G06V 20/40* | (2022.01) |
| *H04L 65/75* | (2022.01) |

(52) U.S. Cl.
CPC .......... *H04L 65/4015* (2013.01); *G06V 20/40* (2022.01); *H04L 65/1093* (2013.01); *H04L 65/75* (2022.05); *H04N 7/15* (2013.01)

(58) Field of Classification Search
CPC ............. H04L 29/06; G06K 9/00; H04N 7/15
USPC ........................................... 348/14.01–14.16
See application file for complete search history.

(56) References Cited

U.S. PATENT DOCUMENTS

| | | | |
|---|---|---|---|
| 8,997,007 B1 * | 3/2015 | Bennett | H04N 21/41407 715/753 |
| 2010/0315482 A1 | 12/2010 | Rosenfeld et al. | |
| 2011/0279629 A1 | 11/2011 | Khot et al. | |
| 2012/0017149 A1 * | 1/2012 | Lai | H04L 65/403 715/758 |
| 2012/0327177 A1 | 12/2012 | Kee et al. | |

(Continued)

OTHER PUBLICATIONS

International Search Report and Written Opinion for International Application No. PCT/US2021/047702, dated Dec. 9, 2021, 21 pages.

*Primary Examiner* — Melur Ramakrishnaiah
(74) *Attorney, Agent, or Firm* — Fenwick & West LLP

(57) ABSTRACT

Disclosed is a system for connecting to an online meeting room with multiple people. A first client device of a first user initiates a connection to the online meeting room. After the connection has been initiated, the first client device starts receiving video data and audio data from one or more client devices of one or more other users connected to the online meeting room. While connected to the online meeting room, the first client device displays a video stream based on the received video data from the one or more client device of the one or more other users connected to the online meeting. Upon receiving a request from a second user to start a conversation with the first user, the first client device plays an audio stream based on the audio data received from the client device of the second user.

18 Claims, 10 Drawing Sheets

(56) References Cited

U.S. PATENT DOCUMENTS

2018/0262716 A1* 9/2018 Kang ..................... G06V 40/20
2021/0352244 A1* 11/2021 Benedetto ................ H04N 7/15

* cited by examiner

User 1

| | T1 | T2 | T3 | T4 | T5 |
|---|---|---|---|---|---|
| U2 | Off | On | On | On | Off |
| U3 | Off | Off | Off | On | Off |
| U4 | Off | Off | Off | Off | Off |
| U5 | Off | Off | Off | Off | Off |

User 2

| | T1 | T2 | T3 | T4 | T5 |
|---|---|---|---|---|---|
| U1 | Off | On | On | On | Off |
| U3 | Off | Off | Off | On | Off |
| U4 | Off | Off | Off | Off | Off |
| U5 | Off | Off | Off | Off | Off |

User 3

| | T1 | T2 | T3 | T4 | T5 |
|---|---|---|---|---|---|
| U1 | Off | Off | Off | Off | Off |
| U2 | Off | Off | Off | Off | Off |
| U4 | Off | Off | Off | Off | Off |
| U5 | Off | Off | On | Off | Off |

User 4

| | T1 | T2 | T3 | T4 | T5 |
|---|---|---|---|---|---|
| U1 | Off | Off | Off | On | Off |
| U2 | Off | Off | Off | On | Off |
| U3 | Off | Off | Off | Off | Off |
| U5 | Off | Off | Off | Off | Off |

User 5

| | T1 | T2 | T3 | T4 | T5 |
|---|---|---|---|---|---|
| U1 | Off | Off | Off | Off | Off |
| U2 | Off | Off | Off | Off | Off |
| U3 | Off | Off | On | Off | Off |
| U4 | Off | Off | Off | Off | Off |

FIG. 3B

PERSISTENT CO-PRESENCE GROUP VIDEOCONFERENCING SYSTEM

CROSS REFERENCE TO RELATED APPLICATIONS

This application claims the benefit of U.S. Provisional Application No. 63/076,307, filed Sep. 9, 2020, which is incorporated by reference in its entirety.

BACKGROUND

This disclosure relates generally to online video conferencing, and more specifically to emulating a virtual presence for users connected to an online meeting room.

Online video conferencing systems allow users to remotely connect with other people and communicate with each other using audio and visual means. However, video conferencing systems do not effectively emulate a real-world environment. For example, in a video conference, each user sends a captured audio feed to a centralized server. The centralized server then combines all of the audio feeds into a single audio stream and sends the audio stream to each user connected to the video conference. As such, every user is capable of listening to all of the users that are talking. But since each user receives a single audio stream, if multiple people talk at the same time, the audio stream sent to the users connected to the video conference includes the superposition of the audio feeds of both users that are talking.

Moreover, since the audio stream sent to each user includes the superposition of the audio feeds of every other user connected to the video conference, only a single conversation can be conducted at a time. If two users connected to video conference want to have a separate conversation among them, those users would have to disconnect from the video conference a start a new session. Thus, making the process inefficient.

Finally, before a conversation between two or more of users can be started through a video conferencing system, the two or more users have to each connect to the video conferencing system. For example, each of the users may connect to a specific address of the video conferencing system at an agreed upon time. This requires pre-planning as the date and time of the meeting, as well as the address for connecting the video conferencing system has to be provided to each user before the connection can be established. In another example, a first user may call a second user. The communication system of the second user may display an indication that the first user has initiated a call and ask the second user whether to accept the call. This requires the first user to guess whether the second user is available to answer the call. Moreover, this requires the second user to see the indication that the first user is calling and explicitly accept the call.

These shortcomings increase the level of friction for people to collaborate with each other when they are physically located in different place. Thus, it would be beneficial to have a system that virtually emulates the presence of a remote user to enable users that are physically located in different places to more easily collaborate with each other.

SUMMARY

Embodiments include a system for connecting to an online meeting room with multiple people. A first client device associated with a first user initiates a connection to the online meeting room. After the connection has been initiated, the first client device starts receiving video data and audio data from one or more client devices of one or more other users also connected to the online meeting room. The one or more client devices of the one or more other users includes a second client device associated with a second user. While connected to the online meeting room, the first client device displays a video stream based on the received video data from the one or more client devices of the one or more other users connected to the online meeting. Upon receiving a request from the second client device, while receiving the video data and audio data from the one or more client devices of the one or more other users connected to the online meeting room, to start a conversation with the first user, the first client device plays an audio stream based on the audio data received from the second client device.

In some embodiments, before displaying a video corresponding to a specific user connected to the online meeting room, the first client device detects the presence of a person in the video data received from a respective client device of the user. If a person is detected, then the first client device includes the video data received from the respective client device of the user in the displayed video stream. Conversely, if a person is not detected, the first client device displays an indication that the user is in an away state.

In some embodiments, for each user connected to the online meeting room, the first client device determines whether to play an audio feed corresponding to a user based at least in part on a conversation status of the user. For instance, if the conversation status indicates that the first user is in an active conversation with second user, the first client device plays the audio feed corresponding to the second user, and the second client device plays the audio feed of the first user. Conversely, if the conversation status indicates that the first user is not in an active conversation with the second user, the first client device does not play the audio feed corresponding to the second user, and the second client device does not play the audio feed of the first user.

In some embodiments, for each user connected to the online meeting room, the first client device assigns an attenuation factor. The first client device determines the attenuation factor based on the conversation status of the corresponding user. For instance, if the conversation status indicates that the first user is in an active conversation with the second user, the first client device assigns a value of 1 (or 100%) to the attenuation factor of the second user. Conversely, if the conversation status indicates that the first user is not in an active conversation with the second user, the first client device assigns a value of 0 (or 0%) to the attenuation factor of the second user. The first client device then multiples the audio data for each user with a corresponding attenuation factor and combines the attenuated audio data to generate an output audio stream.

BRIEF DESCRIPTION OF THE DRAWINGS

FIG. 3B illustrates a timing diagram of the audio output of users connected to a meeting room, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1A:
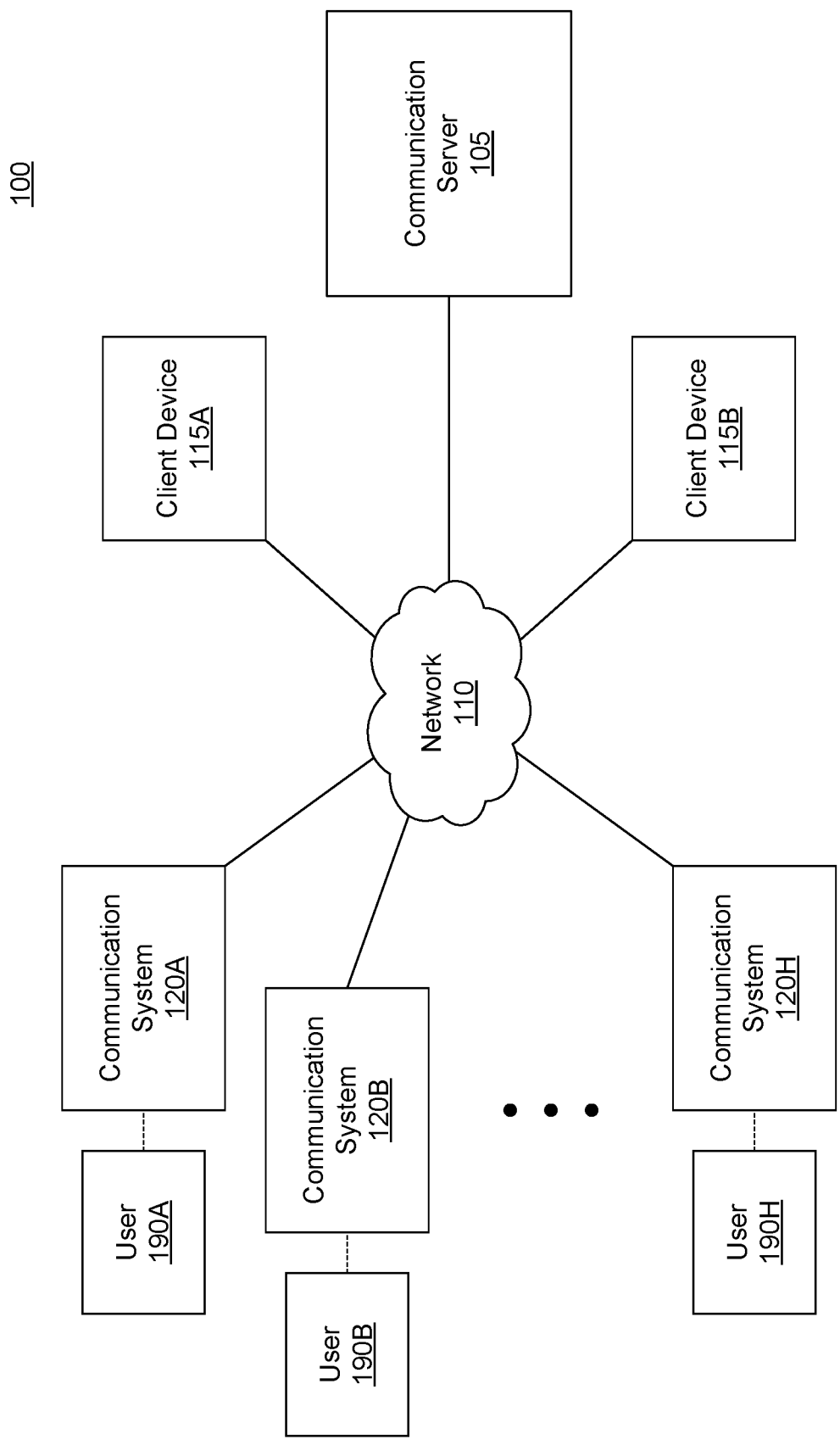
FIG. 1A illustrates a block diagram of a system environment 100 for a communication system 120, in accordance with an embodiment.

FIG. 1A illustrates a block diagram of a system environment 100 for a communication system 120, in accordance with an embodiment. The system environment includes eight users 190A through 190H connected to an online meeting room, according to one embodiment. The system environment 100 further includes a communication server 105, one or more client devices 115 (e.g., client devices 115A, 115B), and a network 110. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120. The communication system 120 is described in more detail below in conjunction with FIG. 1B.

Each user 190 connects to the meeting room using a communication system 120. In some embodiments, to connect to the meeting room the communication device sends a request to the communication server 105 and the communication server 105 facilitates the communication between each of the users connected to the meeting room. For instance, the communication system 120 of each user captures video and audio data using an integrated camera and microphone, and sends the captured video and audio data to the communication server 105. The communication server 105 then forwards the video and audio data to other users connected to the meeting room.

In some embodiments, each of the communication systems 120 are configured to connect to a specific meeting room at a preset time. For example, each communication system 120A through 120H is configured to connect to the meeting room every weekday at 10 A.M. Moreover, each of the communication systems 120 are configured to disconnect from the meeting room at a preset time.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

Figure 1B:
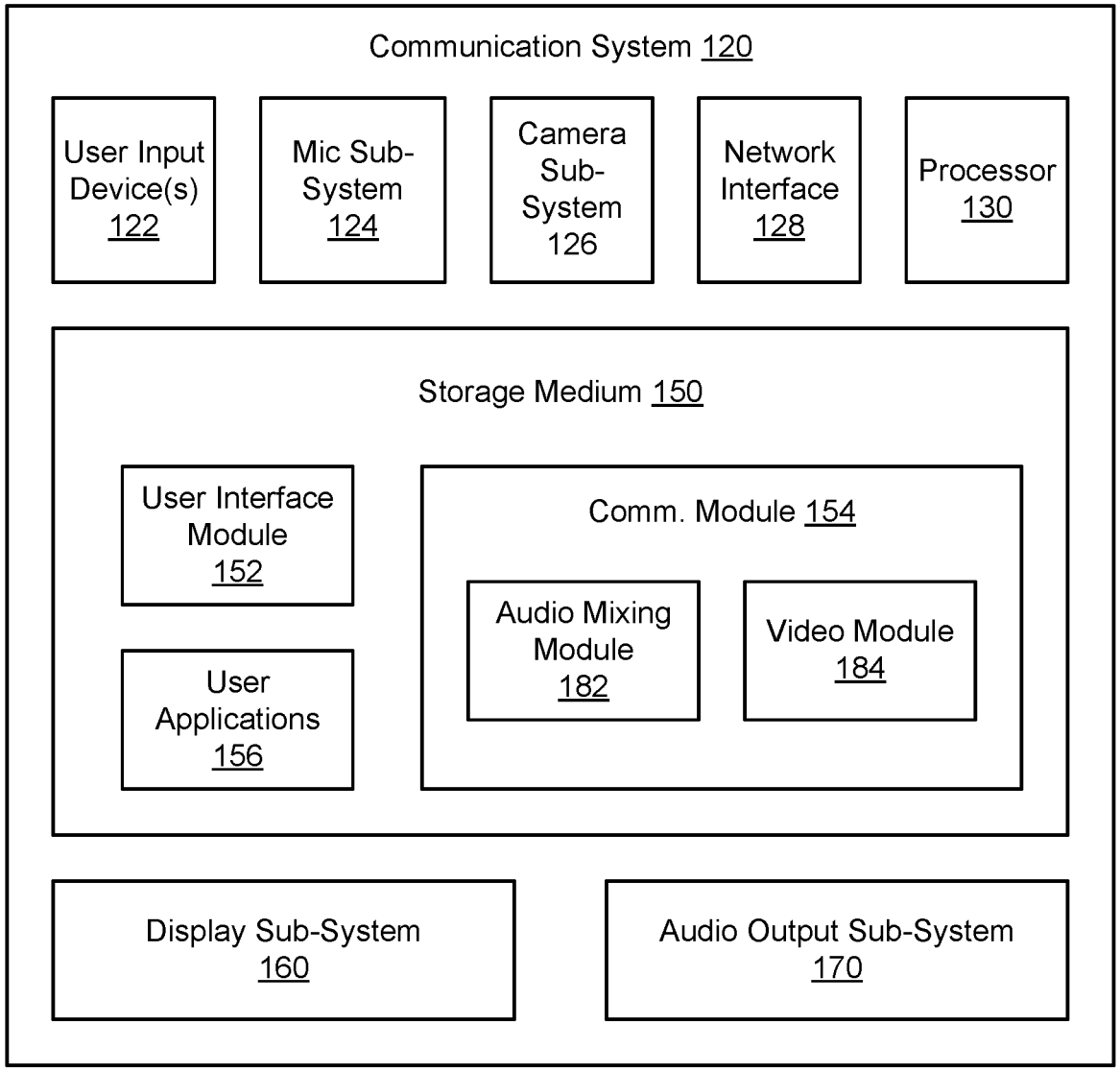
FIG. 1B is a block diagram of a communication system 120, in accordance with an embodiment.

FIG. 1B is a block diagram of a communication system 120, in accordance with an embodiment. The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, and user applications 156. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The communication module 154 includes an audio mixing module 182 and a video module 184. The audio mixing module 182 receives multiple audio feeds, each corresponding to a different user connected with the communication system 120 and combines the audio feeds to generate an output audio stream. The output audio stream is then sent to the audio output sub-system 170 for playback. The video module 184 receives multiple video feeds, each corresponding to a different user connected with the communication system 120 and combines the video feeds to generate an output video stream. The output video stream is then sent to the display sub-system 160 for display.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

Virtual Presence Video Meeting

Figure 2A:
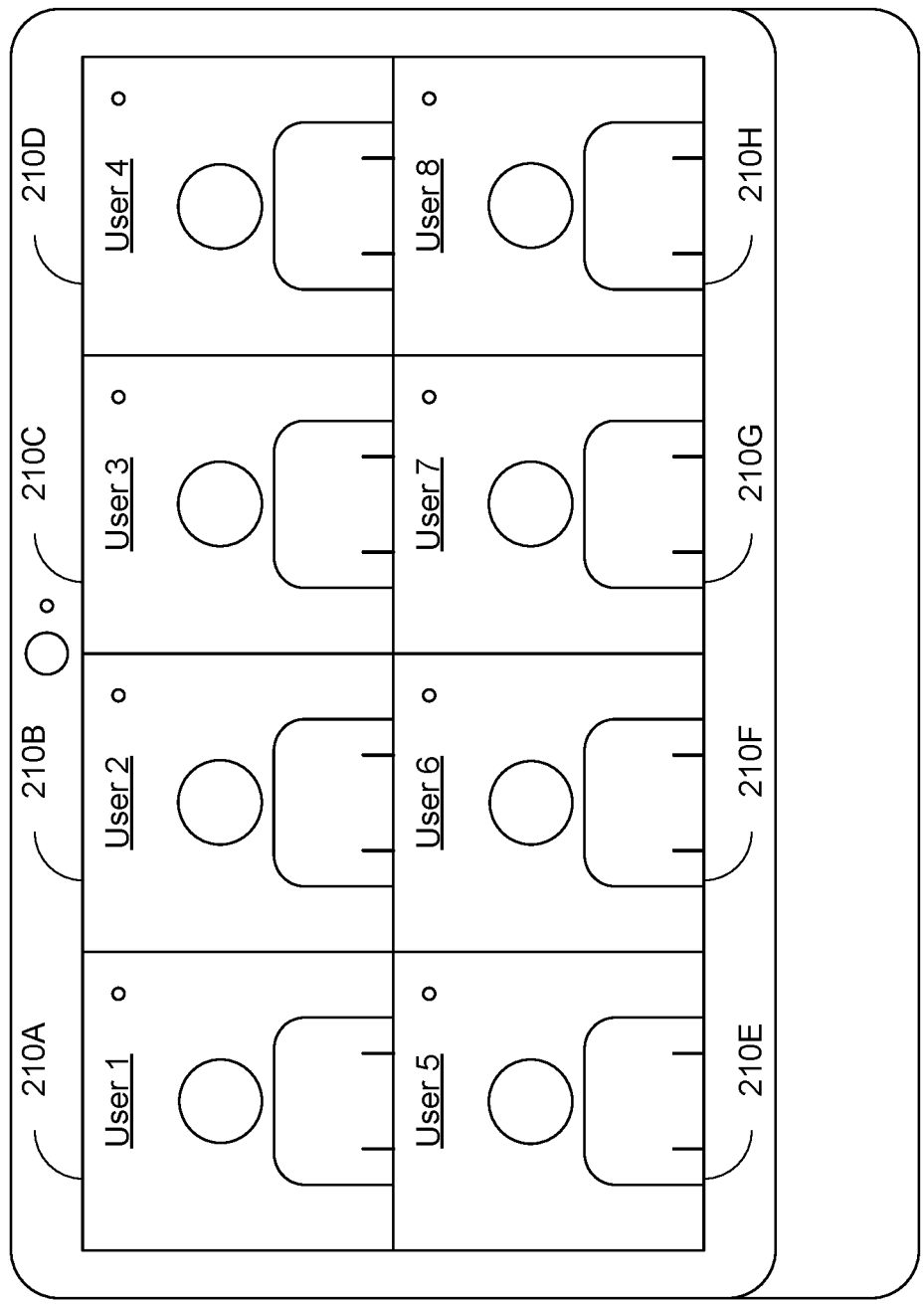
FIG. 2A illustrates a diagram of a virtual presence video meeting using a communication system, according to one embodiment.

FIG. 2A illustrates a diagram of a virtual presence video meeting using a communication system, according to one embodiment. The communication system 120 receives audio-visual data captured by other users that are connected to a meeting room and displays a video feed of the users that are connected to the meeting room. In the example of FIG. 2A, eight users are displayed. However, any number of users may be connected to the meeting room and displayed via the communication system 120. In some embodiments, the communication system 120 automatically connects to a meeting room based on a time/date or an identification of the presence of a user in the surroundings of the communication system 120. For example, the communication system 120 may be configured to connect to a specific meeting room every weekday at 10 AM.

Once the communication system 120 is connected to the meeting room, the communication system 120 starts capturing a video (e.g., using an integrated camera), and audio (e.g., using an integrated microphone) and transmit the captured video and audio to the communication system 120 of other users connected to the meeting room.

Moreover, once the communication system 120 is connected to the meeting room, the communication system 120 starts receiving video and audio data captured by the communication systems 120 of the other users connected to the meeting room. Since the audio and video data from each user are received as separate feeds, each audio and video feed can be manipulated independently. For example, each of the audio feeds corresponding to each user in the meeting room can be manipulated independently. Each audio feed from each of the users can be attenuated or amplified with a different value. The communication system can apply an attenuation function to the audio feeds corresponding to one or more users to mute those audio feeds such that the audio feed received from the attenuated users are not played. In a different example, each of the audio feeds may be amplified with a different intensity to equalize the sound volume played for each of the users in the meeting.

In some embodiments, the communication system 120 is configured to display a video feed corresponding to the received video data of every user connected to the meeting room but mute the audio feed corresponding to the received audio data of every user connected to the meeting room. That is, the audio feeds from every user is automatically set to a muted state upon start of the video meeting. The communication system 120 then sets one or more of the audio feeds to an unmuted state in response to receiving an input from the user of the communication system 120, or in response to receiving a signal from a communication system 120 from the communication system 120 of another user connected to the meeting room.

Figure 2B:
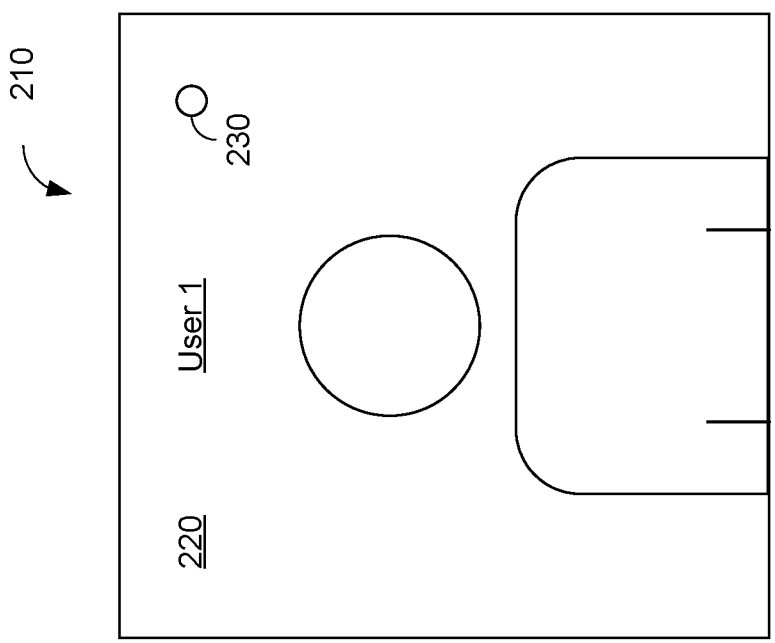
FIG. 2B illustrates a graphical user interface displaying a video feed of a user connected to the meeting room, according to one embodiment.

FIG. 2B illustrates a graphical user interface displaying a video feed of a user connected to the meeting room, according to one embodiment. The user interface 210 includes at least a video feed 220 and a conversation status indicator 230.

The video feed 220 displays at least a portion of the video feed received from a corresponding user that is connected to the meeting room. In the example of FIG. 2B, the video feed of User 1 is displayed. In some embodiments, the communication system 120 modifies the video feed prior to displaying the video feed in the user interface 210. For example, the communication system 120 may crop the video feed based on an aspect ratio of the user interface 210. In some embodiments, the communication system 120 performs a face detection and crops the video feed such that a detected face in the video feed is near the center of the user interface 120.

In some embodiments the communication system 120 detects the presence of a person within the video feed and displays the video feed in the user interface 210 if the presence of a person is detected within the video feed. Conversely, if the presence of a person is not detected within the video feed, the communication system 120 displays a message that the user corresponding to the user interface 210 is away. In some embodiments, the user interface 210 may display a profile picture or an avatar of the corresponding user instead of displaying the video feed of the corresponding user.

In some embodiments, a user is able to manually set a "do not disturb" or "busy" status. When a user has set a do not disturb status, other users are prevented from starting a conversation with the user. In some embodiments, the communication system 120 displays a busy or do not disturb icon or message in conjunction for users that have a status set to busy or do not disturb.

The conversation status indicator 230 provides an indication of whether the user is currently in an active conversation with another user in the meeting room. In some embodiments, the indication is provided as a change in color of the conversation status indicator 230. For example, the conversation status indicator may be a red dot when the user corresponding to the user interface is not having any active conversations with any other user in the meeting room. Moreover, the conversation status indicator 230 turns to a different color. For instance, the conversation status indicator 230 for a user turns blue when the user starts a conversation with another user in the meeting room. In some embodiments, the color of the status indicator indicates who the user is having a conversation with. For instance, if the status indicators of two users are blue, then this may indicate that those two users are having a conversation among each other. If a third user joins that conversation, the status indicator of the third user would also turn blue to indicate that all three users are having a conversation. Once the conversation ends, the status indicator 230 returns to the inactive status (e.g., red dot) to indicate that the users are no longer having an active conversation.

In some embodiments, multiple separate conversations are active at the same time. For example, a first user 190A and a second user 190B can have a first active conversation, while a third user 190C and a fourth user 190D can have a second active conversation, separate from the first active conversation. In this case, the communication system 120 of the first user 190A plays the audio stream of the second user 190B, but does not play the audio stream of the third or fourth user. Similarly, the communication system 120 of the second user 190B plays the audio stream of the first user 190A, but does not play the audio stream of the third or fourth user. Moreover, the communication system 120 of the third user 190C plays the audio stream of the fourth user 190D, but does not play the audio stream of the first or second user. The communication system 120 of the fourth user 190D plays the audio stream of the third user 190C, but does not play the audio stream of the first or second user. If other users 190E to 190H are connected to the meeting room, the communication systems of those users do not play the audio stream of any user.

In this embodiment, the status indicator 230 of the first and second users indicates that the first and second users are having a conversation with each other (e.g., by changing to a first color). Similarly, the status indicator 230 of the third and fourth users indicates that the third and fourth users are having a conversation with each other (e.g., by changing to a second color). Moreover, the status indicators 230 may indicate that two separate active conversations are taking place. Since the color (or any other property) of the status indicators is different between the two conversations, a user looking at the status indicators for the first, second, third, and fourth users are capable of determining which users are talking to each other.

The user interface 210 reacts to inputs received from the user of the communication system 120. In some embodiments, the user interface 210 allows a user of the communication system 120 to start, join, or end a conversation with another user connected to the meeting room. If the user is not in a conversation and the user presses on any portion of the user interface corresponding to a particular user, the communication system 120 starts a new conversation with the particular user. Conversely, if the user is already in a conversation, interacting with the user interface 210 ends the active conversation. If a user interacts with the user interface 210 corresponding to a user that is already in an active conversation, the communication system 120 joins the active conversation.

For instance, upon receiving a user input interacting with the user interface 210 corresponding to a selected user 190, the communication system 120 is configured to start an active conversation with the selected user 190. When starting the conversation with the selected user 190, the communication system 120 unmutes or decreases an attenuation of the audio feed corresponding to the selected user 190. Moreover, the communication system 120 send a request to the communication system 120 of the selected user 190 indicating the start of the conversation. Upon receiving the request, the communication system 120 of the selected user 190 unmutes or reduces an attenuation of the audio feed corresponding to the user initiating the conversation.

That is, for example, if the first user 190A interacts with the user interface 210B corresponding to the second user 190B, the communication system 120A of the first user 190A unmutes the audio feed received from the communication system 120B of the second user 190B and sends a request to the communication system 120B of the second user 190B. Upon receiving the request, the communication system 120B of the second user 190B unmutes the audio fee received from the communication system 120A of the first user 190A. Moreover, the communication system 120A of the first user modifies the conversation status indicator 230B corresponding to the second user 190B, and the communication system 120B of the second user modifies the conversation status indicator 230A corresponding to the first user 190A.

In some embodiments, upon receiving the input interacting with the user interface 210 corresponding to the selected user 190, the communication system sends an indication of the start of the conversation with the selected user 190 to other users connected to the meeting room. That is, for example, if the first user 190A starts a conversation with the second user 190B, the communication system 120A of the first user 190A sends, to the communication system 120 of other users 190C to 190H, an indication identifying the initiation of a conversation between the first user 190A and the second user 190B. Upon receiving the indication, the communication system 120 of other users 190C to 190H change the conversation status indicator corresponding to the first user 190A and the second user 190B to reflect the start active conversation between the first and second user.

In some embodiments, upon starting or joining a conversation, the communication system 120 modifies the user interface to add buttons for controlling the conversation. For example, the buttons may include a button for ending or leaving the conversation, a button for temporarily muting the conversation, a button for recording the conversation, etc.

In some embodiments, upon starting or joining a conversation, the communication system 120 modifies the user interface to enlarge the video feed corresponding to the users that are participating in the conversation. In one embodiment, the communication system 120 only displays the users that are currently participating in the active conversation. When the conversation ends or the user leaves the conversation, the communication system restores the video feed of the other users that are in the meeting room.

Figure 3A:
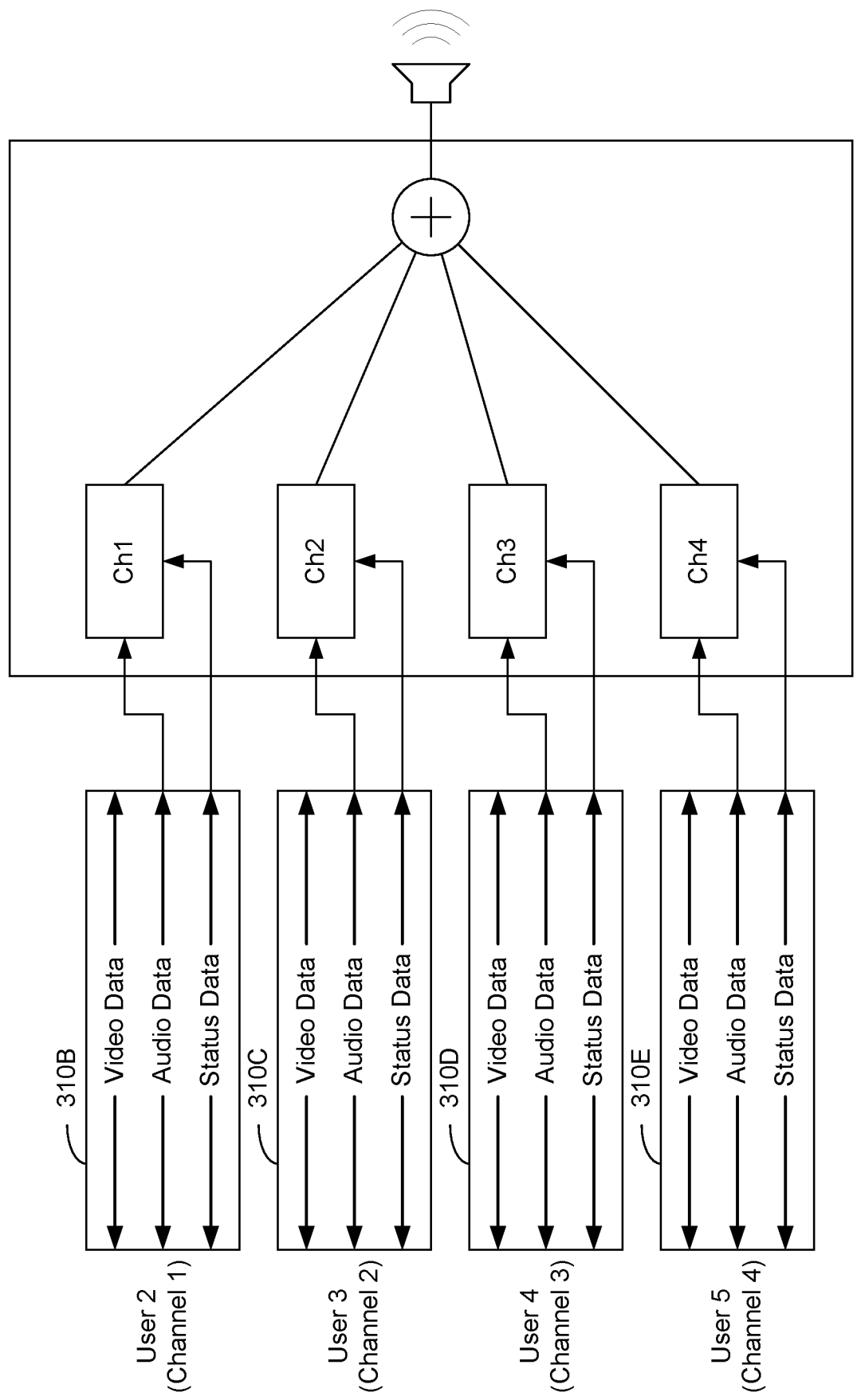
FIG. 3A illustrates a diagram illustrating the generation of an audio output to enable a conversation between multiple users connected to a meeting room, according to one embodiment.

FIG. 3A illustrates a diagram illustrating the generation of an audio output to enable a conversation between multiple users connected to a meeting room, according to one embodiment. The communication system 120 of the first user 190A receives a data stream 310 from the communication system 120 of each user connected to the meeting room. In the example of FIG. 3A, the communication system 120A of the first user 190A receives a data stream 310 from the communication systems 120B to 120E of users 190B to 190E. Each data stream is received as a separate channel such that the communication system 120 is able to independently modify the video data or the audio data of each of the users connected to the meeting room.

The data stream 310 received from each of the communication systems 120 includes video data, audio data, and status data. In one embodiment, the audio mixing module 182 receives the audio data from each of the received data streams and modifies the audio data according to the status data of the data stream 310. If the status data for a particular user indicates that the particular user is not in an active conversation with the user of the communication system 120, the communication system 120 attenuates the audio data of the particular user such that the audio data is not played by the communication system 120.

That is, the audio mixing module 182 of the communication system 120A of the first user 190A determines whether the status data received from the communication system 120B of the second user 190B indicates that the second user 190B is in an active conversation with the first user 190A. If the second user 190B is not in an active conversation with the first user 190A, the audio mixing module 182 of the communication system 120 of the first user 190A attenuates or mutes the audio data corresponding to the second user 190B. Similarly, the audio mixing module 182 of the communication system 120 of the first user 190A analyzes the status data of the other users 190C, 190D, and 190E, and modifies the audio stream of those users accordingly.

The audio mixing module 182 combines the modified audio stream to generate an output audio feed for playback by the audio output sub-system 170. As such, only the audio data that was not attenuated is played by the audio output sub-system 170. That is, the audio output sub-system 170 only plays the audio data of users participating in an active conversation with the first user 190A.

In other embodiments, instead of attenuating the audio data, the audio mixing identifies the users having an active conversation with the first user 190A and combines the audio data of the users identified as having an active conversation with the first user 190A.

FIG. 3B illustrates a timing diagram of the audio output of users connected to a meeting room, according to one embodiment. In the example of FIG. 3B, five users 190A through 190E are connected to a meeting room. The timing diagram is divided into five time periods T1 through T5.

During the first time period T1 and the fifth time period T5, none of the users are having an active conversation. During the first time period T1 and the fifth time period T5, all of the channels for every user is turned off. In some embodiments, this is the default state when the meeting starts.

During the second time period T2, the first user 190A and the second user 190B start an active conversation. The conversation between the first user 190A and the second user 190B ends at the end of the fourth time period T4. During the second time period T2, the communication system 120A of the first user 190A turns on (e.g., stops attenuating) the channel corresponding to the second user 190B, and the communication system 120B of the second user 190B turns on the channel corresponding to the first user 190A. As such, the first user 190A can hear the audio from the second user 190B, and the second user 190B can hear the audio from the first user 190A. Moreover, the first user 190A and the second user 190B keeps the channels corresponding to the third user 190C, fourth user 190D, and fifth user 190E.

During the third time period T3, the third user 190C starts a new conversation with the fifth user 190F. The conversation between the third user 190C and the fifth user 190E stops at the end of the third time period T3. Thus, during the third time period T3, the first user 190A and the second user 190B are having a first conversation while the third user 190C and the fifth user 190F are having a second conversation separate from the first conversation. During the third time period T3, the communication system 120C of the third user 190C turns on the channel corresponding to the fifth user 190E, and the communication system 120E of the fifth user 190E turns on the channel corresponding to the third user 190C. As such, the third user 190C can hear the audio from the fifth user 190E, and the fifth user 190E can hear the audio from the third user 190C.

Moreover, since the channel corresponding to the second user is on in the communication system 120A of the first user 190A and the channel corresponding to the first user is on in the communication system 120B of the second user 190B, the first user 190A and the second user 190B can hear each other. Since the communication system 120A of the first user 190A and the communication system 120B of the second user 190B keep the channels corresponding to the third user 190C and the fifth user 190E, the first user 190A and the second user 190B are unable to hear the conversation between the third user 190C and the fifth user 190E.

During the fourth period T4 the fourth user 190D joins the first conversation with the first user 190A and the second user 190B. When the fourth user 190D sends a request to join the conversation between the first user 190A and the second user 190B, the communication system 120D of the fourth user 190D turns on the channels corresponding to the first user 190A and the second user 190B, allowing the fourth user 190D to hear the audio transmitted by the communication system 120 of the first user 190A and the second user 190B. Upon receiving the request from the communication system 120D of the fourth user, the communication system 120 of the first user 190A and the second user 190B turn on the channel corresponding to the fourth user 190D. As such, the tree users are able to hear each other.

Figure 4:
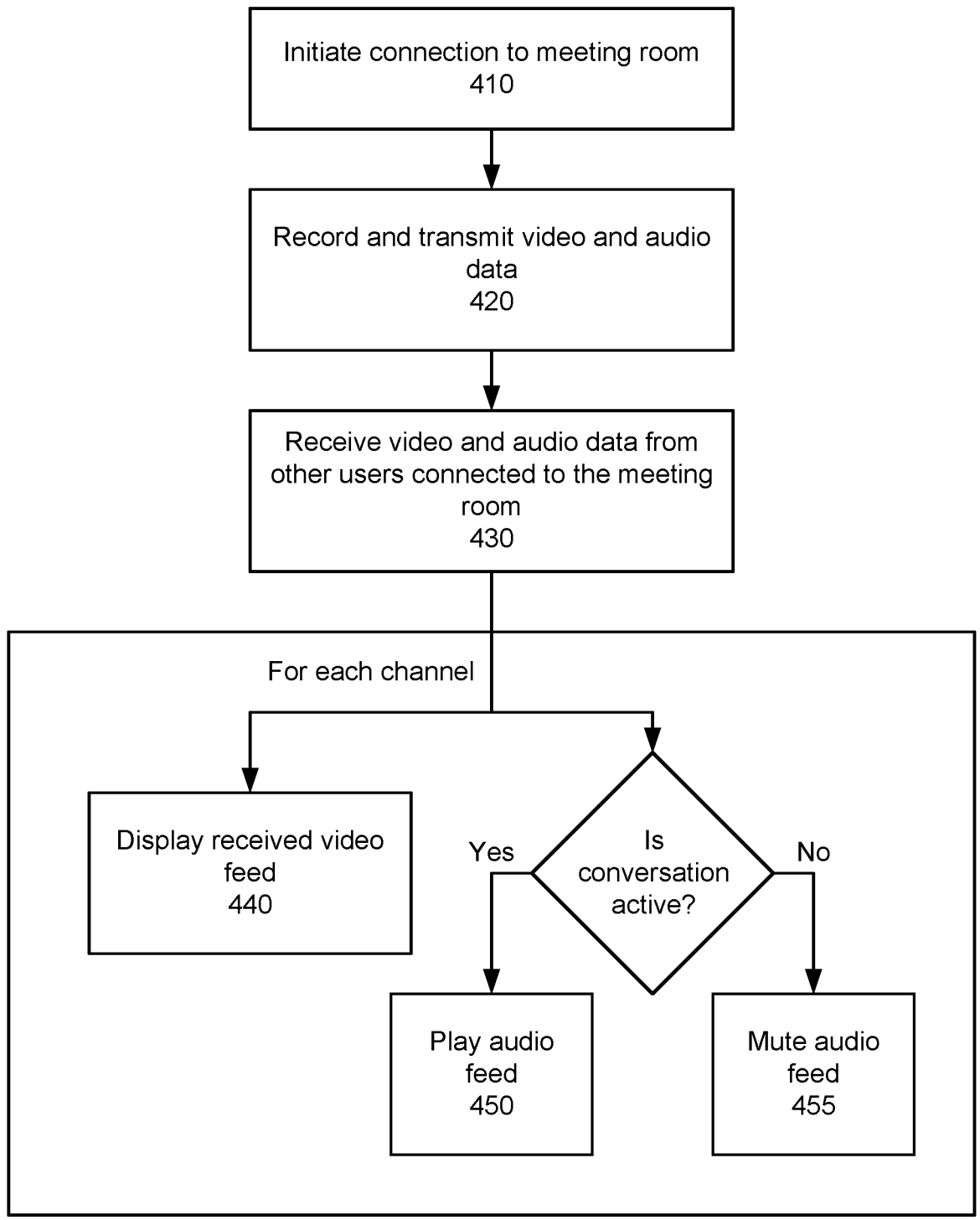
FIG. 4 illustrates a flow diagram of a method for turning on or turning off a channel for users connected to a meeting room, according to one embodiment.

FIG. 4 illustrates a flow diagram of a method for turning on or turning off a channel for users connected to a meeting room, according to one embodiment. The communication system 120A of the first user 190A initiates 410 a connection to a meeting room. In some embodiments, the communication systems 120 of each user registered to the meeting room automatically initiates a connection at a predetermined time and date. For example, every communication system 120 registered with a particular meeting room initiates a connection with the meeting room every weekday at 10 AM.

Once connected to the meeting room, the communication system 120A captures and transmits 420 video and audio to the communication system 120 of other users 190 connected to the meeting room. Moreover, the communication system 120A receives 430 a data stream 310 including video, audio, and status data from the communication system 120 of the other users 190 connected to the meeting room.

For each user connected to the meeting room, as the communication system 120A receives the data stream 310, the communication system 120A displays 440 a video feed corresponding to received video data. In some embodiments, the displayed video feed is a cropped version of the received video data. In some embodiments, the communication system 120A performs a presence detection algorithm to determine whether to display a video feed.

Moreover, for each user connected to the meeting room, as the communication system 120A receives the data stream 310, the communication system 120A determines if the first user 190A is in an active conversation with the user 190 corresponding to the received data stream 310 and modifies the audio data in view of the determination. In some embodiments, the determination is performed based on the status data included in the data stream 310. If the communication system 120A determines that the first user 190A is not in an active conversation with the user 190 corresponding to the received data stream 310, the communication system 120A mutes 455 the audio feed associated with the audio data corresponding to the user 190. For example, the communication system 120A attenuates the audio feed associated with the audio data corresponding to the user 190. Alternatively, if the communication system 120A determines that the first user 190A is in an active conversation with the user 190 corresponding to the received data stream 310, the communication system 120A plays 450 the audio feed associated with the audio data corresponding to the user 190.

Figure 5A:
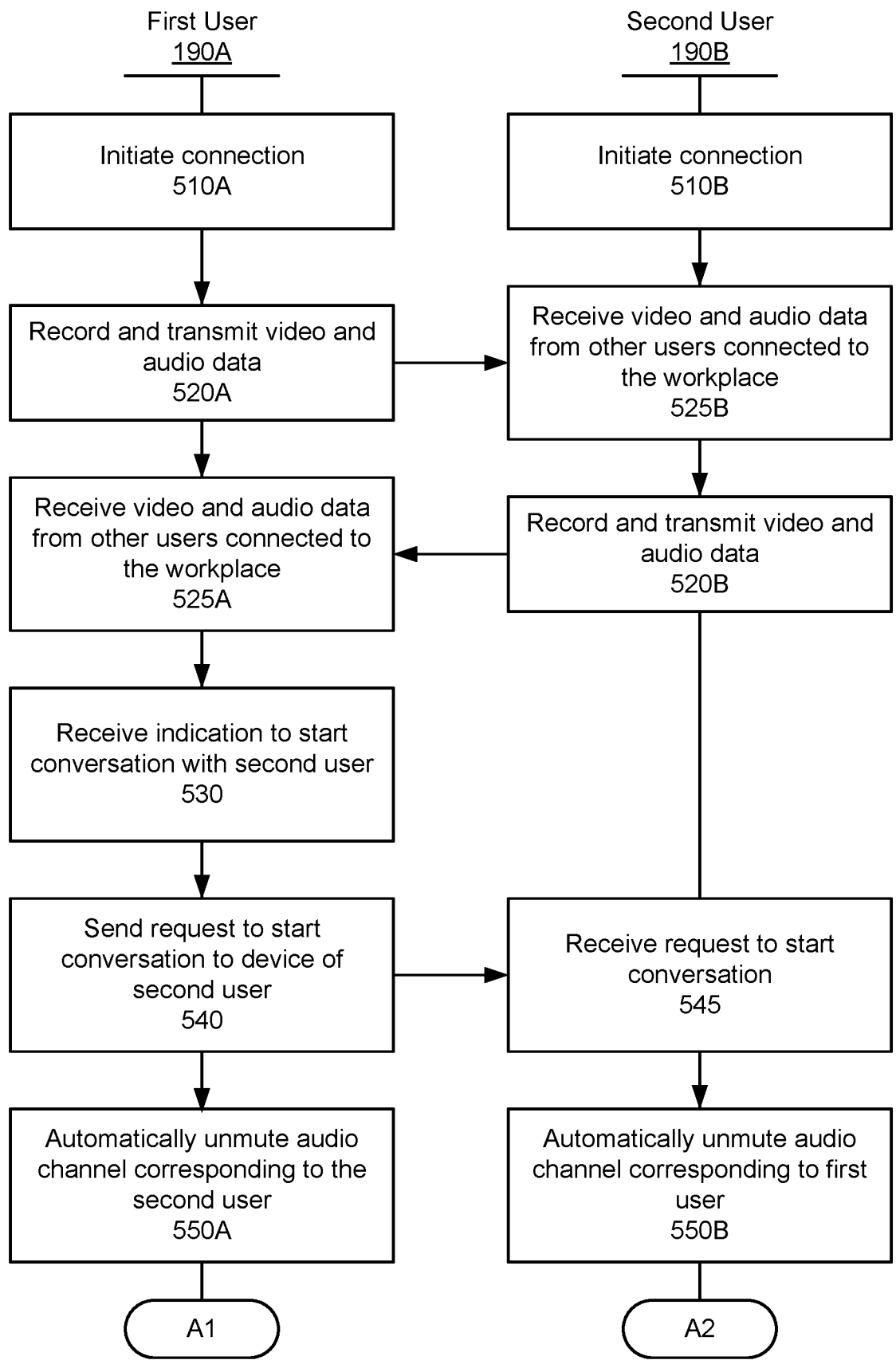
FIG. 5A illustrates a flow diagram of a method for starting a conversation with a user connected to a meeting room, according to one embodiment.

FIG. 5A illustrates a flow diagram of a method for starting a conversation with a user connected to a meeting room, according to one embodiment. The communication system 120A of the first user 190A initiates 510A a connection to a meeting room. Similarly, the communication system 120B of the second user 190B initiates 510B a connection to a meeting room. In some embodiments, the communication system 120A of the first user 190A automatically connects to the meeting room at a preset time. For example, the communication system 120A automatically connects to the meeting room every workday at 10 A.M. Moreover, in some embodiments, the communication system 120A automatically disconnects from the meeting room at a preset time. For example, the communication system 120A automatically disconnects from the meeting room after 8 hours of being connected.

Once connected to the meeting room, the communication system 120A captures and transmits 520A video and audio to the communication system 120 of other users 190 connected to the meeting room. Moreover, the communication system 120A receives 525A a data stream 310 including video, audio, and status data from the communication system 120 of the other users 190 connected to the meeting room.

The communication system 120A of the first user 190A receives 530 an indication, through a user interface 210, to start a conversation with a second user 190B. For example, the communication system 120A receives a touch input on the video feed corresponding to the second user 190B.

Upon receiving the indication from the first user 190A, the communication system 120A of the first user 190A sends 540 a request to the communication system 120B of the second user 190B to start a conversation. In some embodiment, the request is sent as a change in the status data included in the data stream 310A transmitted by the communication system 120A of the first user 190A. Moreover, the communication system 120A automatically unmutes 550A the audio channel corresponding to the second user 190B. In some embodiments, the communication system 120A of the first user 190A waits until receiving an acknowledgement from the communication system 120B of the second user 190B before unmuting the audio channel corresponding to the second user.

The communication system 120B of the second user 190B receives 545, from the communication system 120A of the first user 190A, the request to start the conversation. The communication system 120B of the second user 190B automatically unmutes 550B the audio channel corresponding to the first user.

Figure 5B:
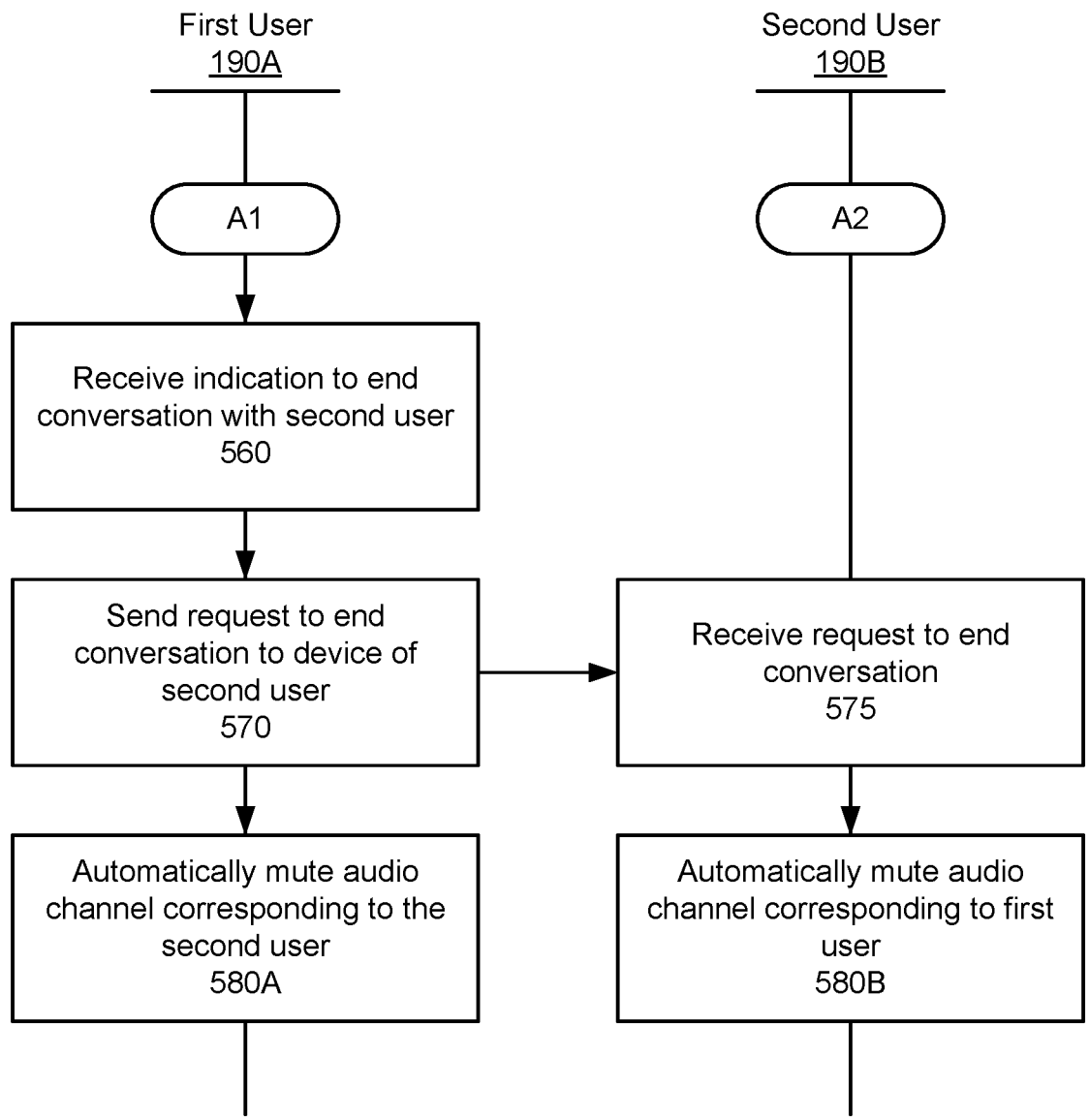
FIG. 5B illustrates a flow diagram of a method for ending a conversation with a user connected to a meeting room, according to one embodiment.

FIG. 5B illustrates a flow diagram of a method for ending a conversation with a user connected to a meeting room, according to one embodiment. After a conversation between the first user 190A and the second user 190B has been established, the communication system 120A of the first user receives 560 an indication to end the conversation with the second user. For example, the communication system 120A receives a touch input on the video feed corresponding to the second user 190B.

Upon receiving the indication from the first user 190A, the communication system 120A of the first user 190A sends 570 a request to the communication system 120B of the second user 190B to end the conversation. In some embodiment, the request is sent as a change in the status data included in the data stream 310A transmitted by the communication system 120A of the first user 190A. Moreover, the communication system 120A automatically mutes 580A the audio channel corresponding to the second user 190B. In some embodiments, the communication system 120A of the first user 190A waits until receiving an acknowledgement from the communication system 120B of the second user 190B before muting the audio channel corresponding to the second user.

The communication system 120B of the second user 190B receives 575, from the communication system 120A of the first user 190A, the request to end the conversation. The communication system 120B of the second user 190B automatically mutes 580B the audio channel corresponding to the first user.

Although the example of FIG. 5B shows that the first user 190A provides the indication to end the conversation, in some embodiments, the indication to end the conversation may be sent by any user participating in the conversation. In one embodiment, if multiple users are participating in a conversation, a user sends requests to withdraw from the conversation. In this embodiment, the other users in the conversation stay in the conversation but mutes the audio channel corresponding to the user that sent the request to withdraw from the conversation. Moreover, the user that sent the request to withdraw from the conversation mutes the audio channel corresponding to every user in the conversation.

Figure 6:
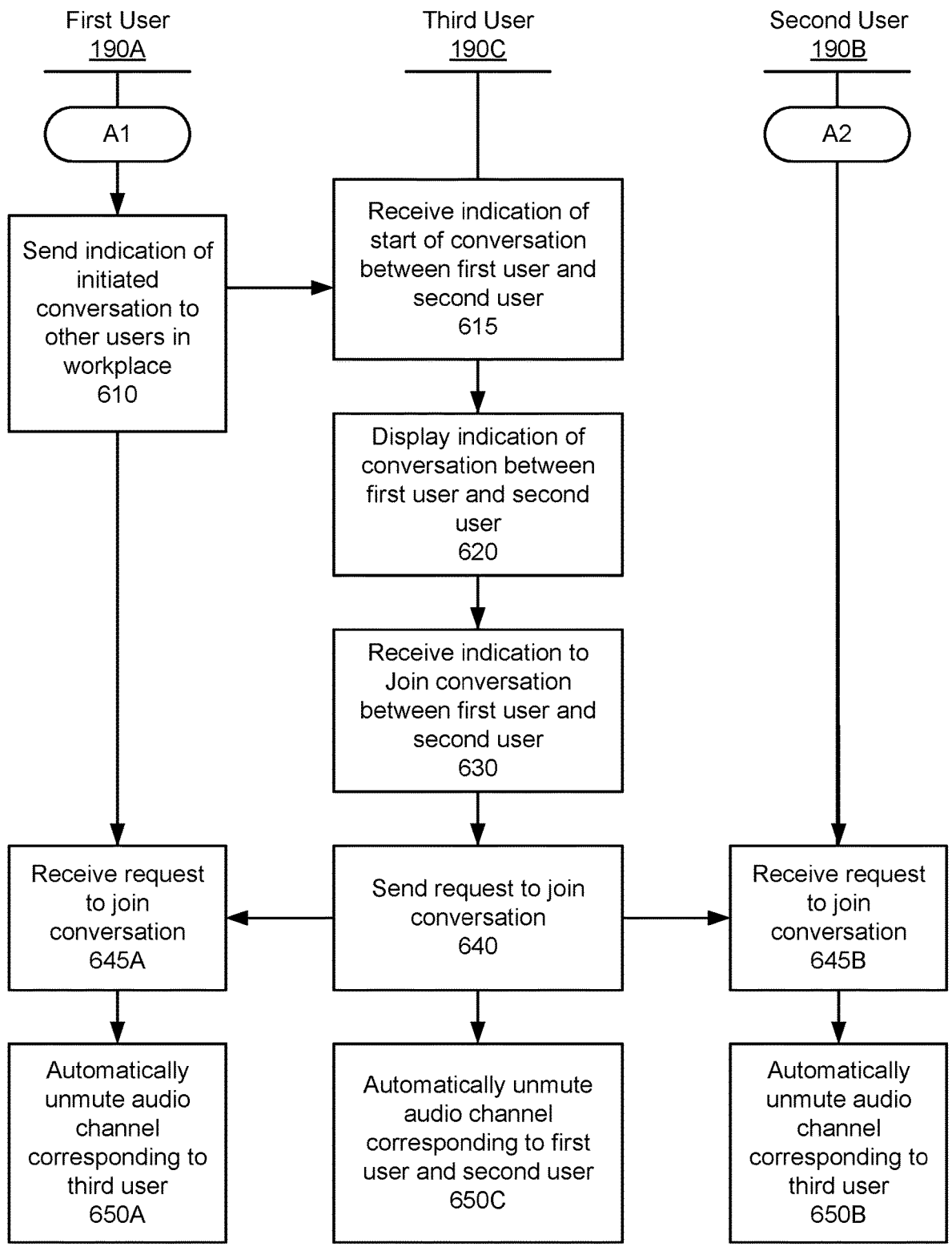
FIG. 6 illustrates a flow diagram of a method for joining an active conversation with users connected to a meeting room, according to one embodiment.

FIG. 6 illustrates a flow diagram of a method for joining an active conversation with users connected to a meeting room, according to one embodiment.

Upon receiving the indication from the first user 190A to start a conversation with the second user 190B, the communication system 120A of the first user 190A sends 610 am indication request to the communication system 120B of the second user 190B to start a conversation. In some embodiment, the indication is sent as a change in the status data included in the data stream 310A transmitted by the communication system 120A of the first user 190A.

The communication system 120C of the third user 190C receives 615 the indication of the start of the conversation between the first user 190A and the second user 190B. The communication system 120C of the third user 190C displays an indication of the conversation between the first user 190A and the second user 190B. The indication may be displayed a change in the conversation status indicator 230 corresponding to the first user 190A and the second user 190B. For example, the status indicators corresponding to the first user 190A and the second user 190B are modified to have a specific color.

The communication system 120C of the third user 190C receives 630 an indication to join the conversation the first user 190A and the second user 190C. For example, the communication system 120C receives a touch input on the video feed corresponding to the first user 190A or the second user 190B.

Upon receiving the indication from the third user 190C, the communication system 120C of the third user 190C sends 640 a request to the communication system 120A of the first user 190A and the communication system 120B of the second user 190B to join the conversation. In some embodiment, the request is sent as a change in the status data included in the data stream 310C transmitted by the communication system 120C of the third user 190C. Moreover, the communication system 120C automatically unmutes 550C the audio channel corresponding to the first user 190A and the second user 190B. In some embodiments, the communication system 120C of the third user 190C waits until receiving an acknowledgement from the communication system 120A of the first user 190A and the communication system 120B of the second user 190B before unmuting the audio channel corresponding to the first user and the second user.

The communication system 120A of the first user 190A receives 545A, from the communication system 120C of the third user 190C, the request to join the conversation. The communication system 120A of the first user 190A automatically unmutes 550A the audio channel corresponding to the third user. Similarly, the communication system 120B of the second user 190B receives 545B, from the communication system 120C of the third user 190C, the request to join the conversation. The communication system 120B of the second user 190B automatically unmutes 550B the audio channel corresponding to the third user.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
at a first client device associated with a first user:
initiating a connection to an online meeting room,
receiving video data and audio data from one or more client devices of one or more other users also connected to the online meeting room, the one or more client devices of the one or more other users including a second client device associated with a second user,
responsive to being connected to the online meeting room, displaying a video stream based on the received video data from the one or more client devices of the one or more other users connected to the online meeting,
while receiving the video data and audio data from the one or more client devices of the one or more other users connected to the online meeting room, receiving a request from the second client device of the one or more client devices to start a conversation with the first user, and
responsive to receiving the request, playing an audio stream based on the audio data received from the second client device;
for each other user of the one or more other users connected to the online meeting room:
assigning an attenuation factor corresponding to the other user based on a conversation status between the other user and the first user, and
attenuating, based on the assigned attenuation factor, an audio feed corresponding to the other user;
combining the attenuated audio feeds corresponding to each other user of the one or more other users connected to the online meeting room; and
playing the combined attenuated audio feed.

2. The method of claim 1, wherein displaying the video stream based on the received video data from the one or more client devices of the one or more other users connected to the online meeting comprises:
for each other user of the one or more other users connected to the online meeting room:
detecting a presence of a person in the video data received from a respective client device of the other user, and
responsive to detecting the presence of the person in the video data received from the respective client device of the other user, displaying a video feed corresponding to the other user based on the video data received from the respective client device of the other user.

3. The method of claim 2, wherein displaying the video stream based on the received video data from the one or more client devices of the one or more other users connected to the online meeting further comprises:
for each other user of the one or more other users connected to the online meeting room:
responsive to not detecting the presence of the person in the video data received from the respective client device of the other user, displaying an indication that the other user is away.

4. The method of claim 1, further comprising:
for each other user of the one or more other users connected to the online meeting room:
determining whether to play the audio feed corresponding to the other user based on the conversation status between the other user and the first user.

5. The method of claim 1, wherein assigning the attenuation factor corresponding to the other user based on the conversation status between the other user and the first user comprises:
assigning a value of 0 to the attenuation factor when the other user is not in an active conversation with the first user; and
assigning a value of 1 to the attenuation factor when the other user is in an active conversation with the first user.

6. The method of claim 1, wherein initiating the connection to the online meeting room comprises:
automatically connecting to the online meeting room at a preset time.

7. The method of claim 1, whether the one or more other users connected to the online meeting room comprise a third user and a fourth user, wherein the method further comprises:
responsive to receiving an indication that the third user is in an active conversation with the fourth user:
displaying the indication that the third user is in the active conversation with the fourth user, and
displaying the indication that the fourth user is in the active conversation with the third user.

8. The method of claim 7, further comprising:
responsive to determining that the first user is not in an active conversation with the third user or the fourth user, muting an audio feed corresponding to the third user and the fourth user.

9. The method of claim 8, further comprising:
receiving an indication to join the conversation between the third user and the fourth user;
responsive to receiving the indication to join the conversation between the third user and the fourth user:
sending a request to a client device of the third user and a client device of the fourth user to join the conversation, and
playing an audio stream based on the audio data received from the client device of the third user and the client device of the fourth user.

10. A method comprising:
receiving a data stream from a plurality of client devices connected to an online meeting room, wherein (i) the plurality of client devices is associated with a plurality of users, (ii) the data stream comprises audio data and status data, and (iii) the status data indicates whether a corresponding user is in an active conversation with another user connected to the online meeting room;
for each client device of the plurality of client devices, determining whether a corresponding user is in an active conversation with another user connected to the online meeting room based on the status data included in the data stream of the user;
responsive to determining that a first user of the plurality of users is in an active conversation with a second user of the plurality of users:
displaying an indication that the first user is in an active conversation with the second user, and
displaying an indication that the second user is in an active conversation with the first user;
receiving an indication to join the conversation between the first user and the second user;
responsive to receiving the indication to join the conversation between the first user and the second user:

sending a request to a client device of the first user and a client device of the second user to join the conversation, and playing the audio stream corresponding to the first user and the second user.

11. The method of claim 10, wherein playing the audio stream corresponding to the first user and the second user comprises:

assigning an attenuation factor to each user of the plurality of users connected to the online meeting room, wherein the attenuation factor assigned to the first user and the second user has a non-zero value and the attenuation factor assigned to every other user of the plurality of users connected to the online meeting room has a value of zero and;

attenuating, based on the assigned attenuation factor, an audio feed corresponding to each user of the plurality of users connected to the online meeting room;

generating an audio stream by combining the attenuated audio feeds corresponding to each user of the plurality of users connected to the online meeting room; and playing the generated audio stream.

12. The method of claim 10, further comprising:

receiving video data from the client device of each user of the plurality of users connected to the online meeting room; and responsive to being connected to the online meeting room, displaying a video stream based on the received video data from the client device of each user of the plurality of users connected to the online meeting.

13. The method of claim 12, wherein displaying the video stream based on the received video data from the client device of each user of the plurality of users connected to the online meeting comprises:

for each user of the plurality of users connected to the online meeting room:

detecting a presence of a person in the video data received from the client device of the user, and responsive to detecting the presence of the person in the video data received from the client device of the user, displaying a video feed corresponding to the user based on the video data received from the client device of the user.

14. The method of claim 13, wherein displaying the video stream based on the received video data from the client device of each user of the plurality of users connected to the online meeting further comprises:

for each user of the plurality of users connected to the online meeting room:

responsive to not detecting the presence of a person in the video data received from the client device of the user, displaying an indication that the user is away.

15. A non-transitory computer-readable storage medium, storing instructions configured for execution by one or more processors of a first client device associated with a first user, the instructions when executed by the one or more processors cause the first client device to:

initiate a connection to an online meeting room;

receive video data and audio data from one or more client devices of one or more other users also connected to the online meeting room, the one or more client devices of the one or more other users including a second client device associated with a second user;

responsive to being connected to the online meeting room, display a video stream based on the received video data from the one or more client devices of the one or more other users connected to the online meeting;

while receiving the video data and audio data from the one or more client devices of the one or more other users connected to the online meeting room, receive a request from the second client device of the one or more client devices to start a conversation with the first user;

responsive to receiving the request, play an audio stream based on the audio data received from the second client device;

for each other user of the one or more other users connected to the online meeting room:

assign an attenuation factor corresponding to the other user based on a conversation status between the other user and the first user, and attenuate, based on the assigned attenuation factor, an audio feed corresponding to the other user;

combine the attenuated audio feeds corresponding to each other user of the one or more other users connected to the online meeting room; and play the combined attenuated audio feed.

16. The non-transitory computer readable storage medium of claim 15, wherein the instructions to display the video stream based on the received video data from the one or more client devices of the one or more other users connected to the online meeting cause the first client device to:

for each other user of the one or more other users connected to the online meeting room:

detect a presence of a person in the video data received from a respective client device of the other user, and responsive to detecting the presence of the person in the video data received from the respective client device of the other user, display a video feed corresponding to the other user based on the video data received from the respective client device of the other user.

17. The non-transitory computer readable storage medium of claim 16, wherein the instructions to display the video stream based on the received video data from the one or more client devices of the one or more other users connected to the online meeting further cause the first client device to:

for each other user of the one or more other users connected to the online meeting room:

responsive to not detecting the presence of the person in the video data received from the respective client device of the other user, display an indication that the other user is away.

18. The non-transitory computer readable storage medium of claim 15, wherein the instructions further cause the first client device to:

for each other user of the one or more other users connected to the online meeting room:

determine whether to play the audio feed corresponding to the other user based on the conversation status between the other user and the first user.

* * * * *

UNITED STATES PATENT AND TRADEMARK OFFICE
CERTIFICATE OF CORRECTION

PATENT NO. : 11,451,593 B2
APPLICATION NO. : 17/354544
DATED : September 20, 2022
INVENTOR(S) : Ilona Papava et al.

It is certified that error appears in the above-identified patent and that said Letters Patent is hereby corrected as shown below:

In the Claims

In Column 19, Claim 11, Line 15, delete "zero and;" and insert -- zero; --, therefor.

In Column 20, Claim 16, Line 28, delete "computer readable" and insert -- computer-readable --, therefor.

In Column 20, Claim 17, Line 42, delete "computer readable" and insert -- computer-readable --, therefor.

In Column 20, Claim 18, Line 53, delete "computer readable" and insert -- computer-readable --, therefor.

Signed and Sealed this
Twentieth Day of December, 2022

Katherine Kelly Vidal
*Director of the United States Patent and Trademark Office*